F. W. WAPPAT.
SHOCK ABSORBER FOR REVERSING MECHANISM.
APPLICATION FILED APR. 26, 1919.
1,399,173.
Patented Dec. 6, 1921.
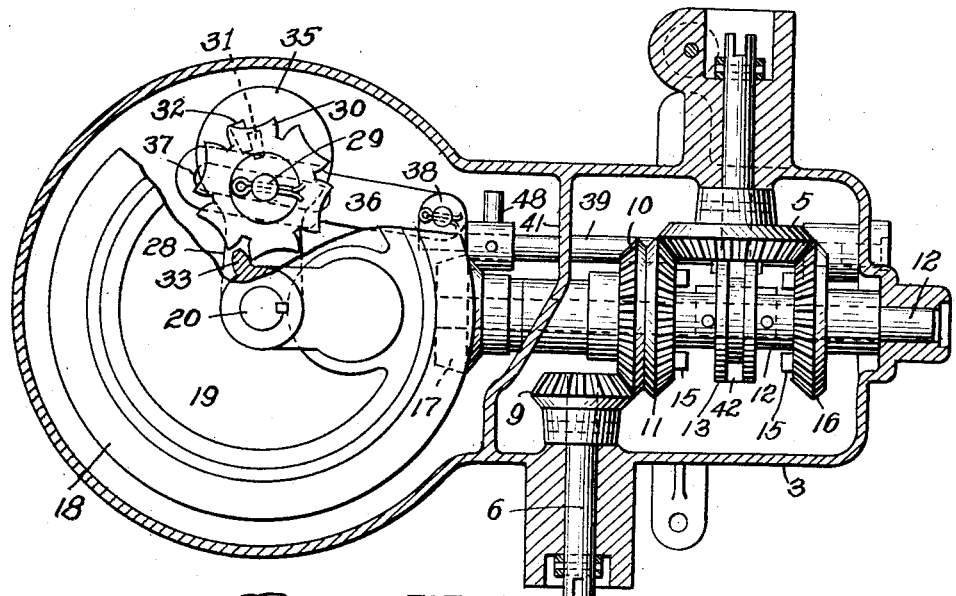
FIG.1.
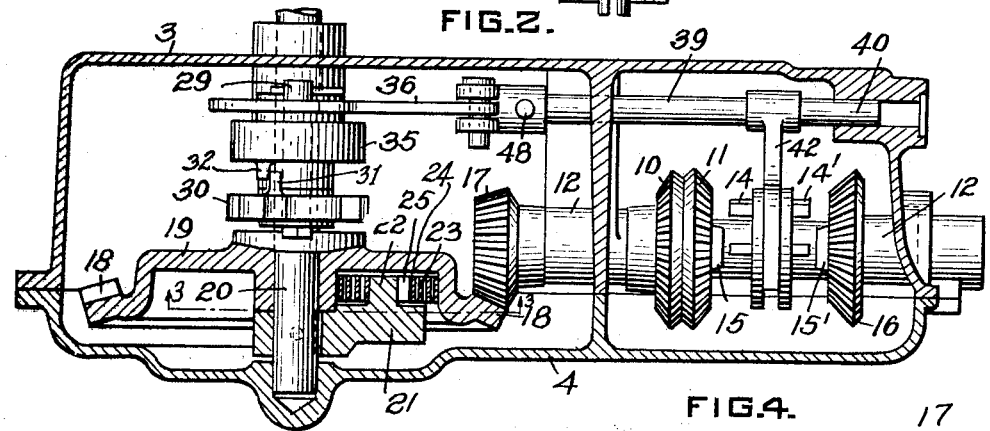
FIG.2.
FIG.3.
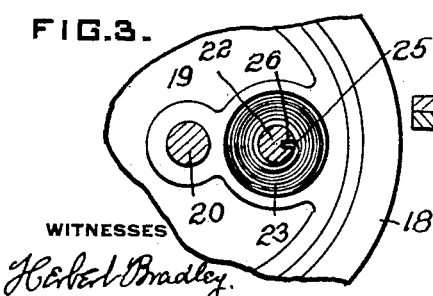
FIG.4.
WITNESSES
J. Herbert Bradley
INVENTOR
Fred W. Wappat,
By Fred'k W. Winter
Attorney

UNITED STATES PATENT OFFICE.

FRED W. WAPPAT, OF PITTSBURGH, PENNSYLVANIA, ASSIGNOR TO PITTSBURGH GAGE & SUPPLY COMPANY, A CORPORATION OF PENNSYLVANIA.

SHOCK-ABSORBER FOR REVERSING MECHANISM.

1,399,173.    Specification of Letters Patent.     Patented Dec. 6, 1921.

Application filed April 26, 1919. Serial No. 292,854.

*To all whom it may concern:*

Be it known that I, FRED W. WAPPAT, a resident of Pittsburgh, in the county of Allegheny and State of Pennsylvania, have invented a new and useful Improvement in Shock-Absorbers for Reversing Mechanism, of which the following is a specification.

This invention relates to shock absorbing means in power reversing mechanism, and is particularly adapted for absorbing shocks due to the reversal of the drum or cylinder in power driven washing machines.

The object of the invention is to provide a shock absorbing connection which is of simple construction, which will yield sufficiently to absorb the shocks, and in which the parts are brought back to normal relation after yielding, as well as having other advantages which will be apparent.

This application is a continuation in part of my application filed March 29, 1918, Serial No. 225,423, for reversing mechanism.

In the accompanying drawings Figure 1 is a sectional elevation of one arrangement of reversing power mechanism for operating washing machines, showing the preferable form of shock absorber applied thereto; Fig. 2 is in part a plan view and in part a horizontal section of the same mechanism; Fig. 3 is a detail sectional view taken on the line 3—3, Fig. 2; and Fig. 4 is a horizontal sectional view showing a modification.

The drawings illustrate one arrangement of reversing mechanism for power driven washing machines, this arrangement being the same as that illustrated, described and claimed in my application above identified. This, however, is merely illustrative, as the shock absorbing means may be applied in many forms of reversing mechanism. As shown the reversing gearing is inclosed in a casing 3 arranged to be secured to the frame of the washing or other machine and closed on its outside by the cover 4. The power can be derived from any suitable source, being shown as applied through a shaft 6 mounted in the casing 3 and carrying a bevel gear 9 which meshes with a bevel gear 10, which has integral therewith or connected thereto a miter clutch gear 11 loosely mounted on the intermediate shaft 12 rotatably mounted in the casing 3. Slidably keyed to the shaft 12 is a clutch member 13, provided on one side with a clutch jaw or lug 14 arranged to engage with a clutch jaw or lug 15 on the face of gear 11, and on its opposite side with a similar jaw or lug 14' arranged to engage with a corresponding jaw or lug 15' on the face of bevel gear 16 which also is loosely mounted on the shaft 12 and faces oppositely to the gear 11. In constant meshing with both gears 11 and 16 is an intermediate bevel gear 5 through which the gear 16 is rotated in opposite direction to that of gear 11.

To the inner end of shaft 12 is secured a bevel pinion 17 which meshes with a bevel gear 18 loosely mounted on the driven shaft 20, the latter serving as the means for driving the cylinder or drum of a washing machine or any other member whose direction of rotation is to be reversed. Keyed to the shaft 20 is an arm 21 provided with a stud 22 which is connected through a resilient shock absorbing member to the gear wheel 18, said resilient member being shown as mounted in a pocket 24 in the web 19 of said gear wheel. This resilient member may be of various forms. Fig. 4 shows it in the form of a rubber ring or washer 23ª which entirely fills pocket 24 and which is provided with a central opening to receive the stud 22. In the preferred form however, this resilient member comprises a spiral spring 23 wound into convolutions and of external size to fit tightly in the pocket 24. The inner end of said spring is bent radial to the spiral, as shown at 25, and engages a slot 26 in pin 22. This resilient member serves to absorb the shock whenever the rotation of shaft 12 is reversed. It forms a flexible connection between the gear 18 and the driven shaft 20, which is sufficiently yielding to take care of the shocks, but nevertheless brings the pin 22 back to central position in the pocket 24 when the extra load of the shock is relieved.

The shaft 12, obviously, is reversed whenever the clutch 13 is shifted from engagement with one of the gears 11 and 16 into engagement with the opposite one thereof. This shifting of the clutch may be effected in various ways, the particular clutch shifting means illustrated being the same as that shown and described in my application before identified, and is herein shown merely in sufficient detail to illustrate one form of clutch shifting means.

Loosely mounted on the shaft 20 is an arm 28 on which there is rotatably mounted a stop gear 30 which is in the form of a star wheel, having in this case six teeth or stops, the number of which are optional but necessarily correspond to the number of revolutions which the shaft 20 must make before it is reversed. On the inner face of star wheel 30 is a lug 31 arranged to engage with a lug 32 on the adjacent face of the arm 28. Projecting from the hub of the gear 18 is a tooth 33, which, at every revolution of the gear 18, engages with one of the teeth of the star wheel 30, and therefore imparts to said star wheel one-sixth of a revolution. When the star wheel has been rotated sufficiently to bring its lug 31 into contact with the lug 32 on the arm 28, it carries said arm in the direction in which the gear 18 is rotating. The arm 28 normally stands at one end or the other of a slot 37 and on its end is provided with a weight 35. Consequently when the arm is shifted in either direction from its upright position by the means above described, the weighted end thereof serves to impart a rapid falling movement thereto which shifts the clutch 13 by the following means:

Connected to the arm 28 by a pin and a slot connection, in this case comprising the end of stub shaft 28 and a slot 37, is a connecting link 36 which has a jointed connection at 38 to a bar or shaft 39, slidably mounted in the bearing 40 in the casing 3 and in the partition 41 of said casing. Secured to the sliding shaft 39 is a yoke 42 which engages the clutch member 13 in a well known manner. Consequently whenever the shaft 20 has rotated in one direction for the desired number of times (determined by the number of teeth on the star wheel 30) the arm 28 is shifted from its upright position, in one direction or the other (depending upon the direction the gear 18 is rotating) and through the parts illustrated a sliding movement is imparted to shaft 39, thus disengaging the clutch 13 from whichever one of the gears 11 or 16 with which it is in engagement and moving it into engagement with the opposite one of said gears. Consequently, the rotation of the shaft 12 is reversed and this reverse rotation is also imparted to the gear 18 and through the pin 22 and arm 21 to the shaft 20. The shock reversal, however, due to the inertia of the member driven by shaft 20, is entirely absorbed by the resilient member 23, which yields sufficiently to absorb the shock, and, when the inertia of the driven member is overcome, restores the normal relation between the arm 21 and gear 18, so that the members are in proper position to take care of the shock in the reverse direction upon the next reversal of the clutch.

The shock absorbing means illustrated is of simple construction, not likely to breakage, and the form shown in Figs. 1 to 3 is not subject to wear. It is retained between the arm 21 and the gear 18, so that it cannot get out of position, but nevertheless is very easy to get at for inspection or renewal.

I claim:

1. Shock absorbing means for reversing mechanism comprising a shaft, a gear loosely mounted thereon, an arm fixed to said shaft, a pin on said arm projecting toward said gear, and a spiral spring all convolutions of which lie in a single plane coiled around said pin on an axis parallel to that of said gear and having its inner end connected thereto and being peripherally engaged in said gear.

2. Shock absorbing means for reversing mechanism comprising a shaft, a gear loosely mounted thereon and provided with a socket, an arm rigidly mounted on said shaft, a pin carried by said arm, a spiral spring all convolutions of which lie in a single plane coiled around said pin on an axis parallel to that of said gear and seated in the socket of the gear.

3. A shock absorbing means for reversing mechanism comprising a shaft, a gear loosely mounted thereon and provided with a radial web and peripheral flange forming an annular recess, a pocket in said recess, an arm rigidly mounted on said shaft, a pin on said arm, a spiral spring attached at its inner end and coiled around said pin on an axis parallel to that of said gear and seated in the pocket, the said arm lying adjacent the gear and partially housed in the said recess.

In testimony whereof, I have hereunto set my hand.

FRED W. WAPPAT.

Witnesses:
R. F. BLAIR,
H. C. TEUFEL.